United States Patent [19]

Hirose

[11] Patent Number: 4,650,712

[45] Date of Patent: Mar. 17, 1987

[54] MAGNETIC HEAD FOR DIGITAL SIGNALS

[75] Inventor: Eiichi Hirose, Yunotani, Japan

[73] Assignee: Alps Electric Co., Ltd., Japan

[21] Appl. No.: 655,924

[22] Filed: Sep. 28, 1984

[30] Foreign Application Priority Data

Sep. 29, 1983 [JP] Japan ................. 58-179401

[51] Int. Cl.[4] .................................................. G11B 7/12
[52] U.S. Cl. ............................. 428/323; 252/62.55;
360/125; 360/126; 360/127; 428/328; 428/329;
428/692; 428/694; 428/698; 428/704; 428/900
[58] Field of Search ................. 252/62.55; 75/0.5 BA,
75/0.5 BC, 126 H, 128 R, 251; 427/34, 38;
360/125, 126, 127; 428/694, 328, 323, 329, 698,
900, 692, 704

[56] References Cited

U.S. PATENT DOCUMENTS

| 3,431,205 | 3/1969 | Otto | 252/62.55 |
| 3,527,595 | 9/1970 | Adler | 75/251 |
| 3,591,362 | 7/1971 | Benjamin | 75/251 |
| 3,661,570 | 5/1972 | Moss | 360/125 |
| 4,268,564 | 5/1981 | Narasimhan | 428/143 |
| 4,330,027 | 5/1982 | Narasimhan | 164/461 |
| 4,395,279 | 7/1983 | Houck | 427/34 |
| 4,508,788 | 4/1985 | Cheney | 428/937 |

FOREIGN PATENT DOCUMENTS 77899 7/1976 Japan.

Primary Examiner—Ellis P. Robinson
Attorney, Agent, or Firm—Guy W. Shoup

[57] ABSTRACT

A magnetic head especially suited for digital signals has cores each of which consists of a composite material. This material is produced by preparing an alloy such as cobalt-iron alloy, iron-silicon-boron alloy, or nickel-silicon-boron alloy, to use it as the matrix of the composite material, then melting the matrix, spraying particles made of carbon, a nitride, an oxide, or other material against the molten matrix to disperse the particles in the matrix uniformly in a three-dimensional way, cooling the matrix to produce an ingot, and refusing the ingot such that the particles do not melt, and solidifying the ingot by rapid quenching.

19 Claims, 8 Drawing Figures

MAGNETIC HEAD FOR DIGITAL SIGNALS

FIELD OF THE INVENTION

The present invention relates to a magnetic head for digital signals and, more particularly, to a core material form which the magnetic circuit of the head is formed.

BACKGROUND OF THE INVENTION

Read-after-write magnetic heads for digital signals are usually installed in computer peripheral devices, and are provided with plural pairs of read/write gaps for a plurality of channels. When a magnetic tape passes above such a magnetic head, a digital signal is written on the tape in a writing gap. Immediately thereafter, the tape passes above a reading gap, and said signal is read out to check the correctness of the signal.

Frequencies in a high-frequency range of about 1 to 3 MHz are used for writing or readout of digital signals by the magnetic head to achieve a high-density recording. Therefore, core materials used for the magnetic head are required to have high magnetic permeabilities and also high saturation magnetic flux densities. Heretofore, permalloy which has been worked into thin sheets of about 25 to 50 $\mu$m thickness has been used as a core material. A certain number of thin sheets of permalloy are stacked on top of each other and bonded together by a molded resin such as epoxy resin.

The magnetic permeability of these laminas of permeability decreases to the range from about 600 to 800 at 1 MHz when internal stress is produced by the molded resin or mechanical tightening. In case where the core material having a poor frequency characteristic in this way is used, signal waveforms result in phase shift at high frequencies, impairing the symmetry of signal waveforms. This reduces the reliability of the computer peripheral devices.

SUMMARY OF THE INVENTION

The present inventors and others have successfully produced magnetic alloys of second phase particle dispersive type using liquid quenching technology which has been known as a method of producing alloys by rapid quenching, and we have found that these new composite materials selectively combine the excellent properties and mechanical functions of both constituents, i.e., magnetic alloys made by rapid quenching and the second phase particles, and that these materials are especially suited for core materials of magnetic heads for digital signals.

In summary, the invention resides in forming at least a part of a magnetic circuit from a composite material which is produced by dispersing at least one kind of second phase particles uniformly in a three-dimensional way in the matrix of an alloy, which is formed by rapid quenching and is in an amorphous or cystalline state or a mixed phase thereof.

Alloys which can be used for the matrix of an alloy made by rapid quenching according to the invention are cobalt alloys consisting principally of cobalt, such as cobalt-iron alloy, ferrous alloys consisting principally of iron, such as iron-silicon-boron alloy and iron-molybdenum alloy, nickel alloys consisting principally of nickel, such as nickel silicon-boron alloy, copper-zirconium alloy, zirconium-niobium alloy, and other various alloys.

Materials which can be used as the second phase particles in the invention are carbon, carbides such as WC, TiC, and NbC, nitrides such as NbN and TaN, oxides such as $Cr_2O_3$, $CeO_2$, MgO, $ZrO_2$, $Y_2O_3$, $WO_3$, $ThO_2$, $Al_2O_3$, $Fe_2O_3$, ZnO, and $SiO_2$, borides such as BN, silicates such as SiC, metals such as Ti, Fe, Mo, W, and other metals.

DETAILED DESCRIPTION OF THE INVENTION

Examples of method of producing core materials according to the present invention are hereinafter described with reference to the accompanying drawings. The principle of a first example of manufacture on which a core material is produced is described by referring to FIGS. 1 and 2, in which FIG. 1 is a view showing the step of producing an ingot; and FIG. 2 is a view showing the step of producing a ribbonlike material using the ingot.

Figure 1:
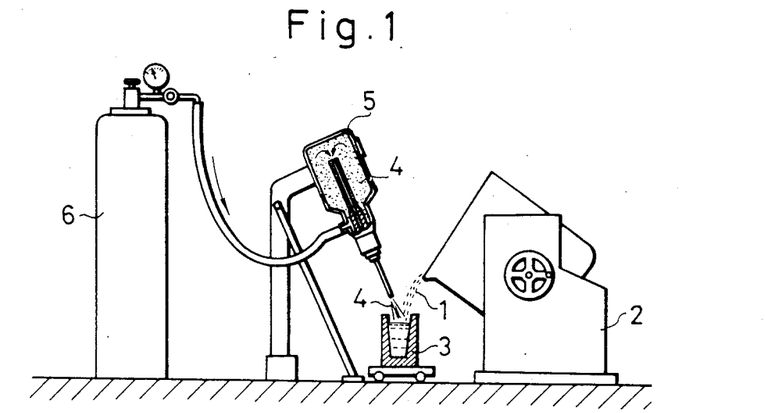
FIGS. 1 and 2 are views showing the principle of a method of producing a core material according to the present invention.

Referring to FIG. 1, the matrix 1 of an alloy which is later subjected to rapid quenching operation after refusing as described later is heated and melted by a vacuum high-frequency melting furnace 2, and then it is poured into an ingot mold 3. Second phase particles 4 are sprayed against the molten matrix 1 that is being poured into the mold 3 by a plasma spray gun 5 to add the particles to the matrix. The matrix is then caused to stand and cooled until it solidifies, whereby an ingot in which the second phase particles 4 are uniformly dispersed is obtained. A spray medium consisting of an inert gas such as argon gas and stored in a bomb 6 is used for the spraying and dispersion of the second phase particles 4. To avoid decomposition of the matrix 1 during the spraying and dispersion, the inert gas is preferably used as a spray medium. The plasma spray gun is preferably used as a means for supplying the second phase particles 4, because it can deliver the particles 4 uniformly at all times, and because spray conditions such as spray pressure can be controlled with relative ease. Further, the nozzle of the gun is excellent in heat resistance.

Methods of producing ribbonlike materials by rapid quenching include single roll method, dual roll method, and centrifugal method. These superfast cooling methods control the composition of an alloy or a rapid cooling condition such as cooling velocity to obtain an amorphous phase, a metastable layer that is not in equilibrium state, a crystalline phase that is in equilibrium state, or the like.

Figure 2:
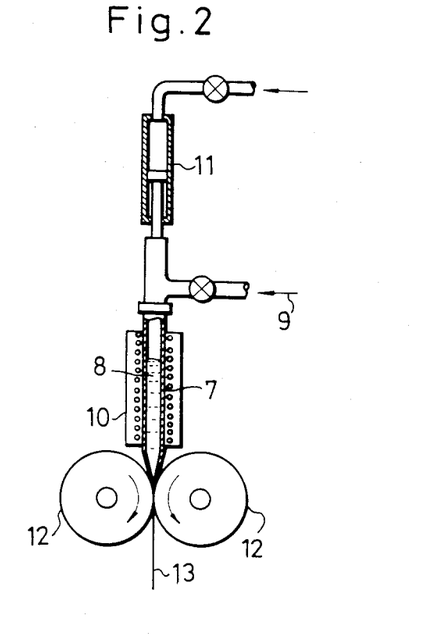

FIG. 2 shows the step of producing a ribbonlike core material by dual roll method. A heat-resisting tube 7 made from quartz glass has a nozzle at its lower end. The aforementioned ingot 8 in which the aforementioned second phase particles are uniformly dispersed is put into the tube 7. The occluded gas in the tube is sufficiently replaced by inert gas 9 such as argon gas. A high-frequency melting furnace 10 is mounted on the outer periphery of the tube 7 to heat the ingot 8 sufficiently to melt it again but insufficiently to melt the second phase particles. Then, a piston 11 is operated so that it may be brought into the closest proximity to the junction of two rolls 12 which are rotating the front end of the nozzle of the tube 7 at a high velocity. Thus, the gas pressure within the tube 7 is abruptly increased. This gradually supplies the refused ingot 8 as a uniform continuous stream to the junction of the rolls 12 from the nozzle. The rolls 12 are always pressed against each other while rotated at a high velocity. Therefore, as soon as the molten metal is pushed out, it is cooled and solidified thus to produce a continuous ribbonlike core material 13.

Figure 3:
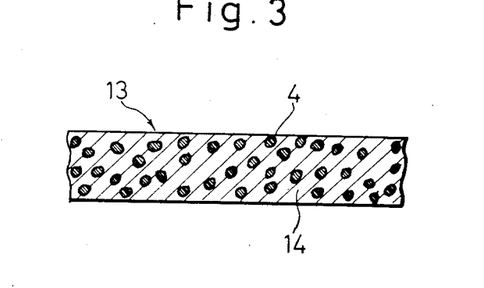
FIG. 3 is an enlarged cross section of a produced core material.

This core material 13 is shown in FIG. 3 in enlarged cross section, where the microscopic second phase particles 4 are uniformly dispersed in three-dimensional way throughout the matrix 14 of the alloy which is in amorphous or crystalline state or a mixed phase thereof. It is possible to control the thickness, the width, and so on of the core material 13 by changing the peripheral velocity of the rolls 12, the force with which the rolls are pressed, the temperature of the molten material, the velocity of the ejection, and other parameters.

The dual roll method described in connection with FIG. 2 is advantageous in that the obtained core material has a uniform thickness and small surface roughness on both sides. In addition, it is easy to produce a relatively thick core material by the dual roll method. Although this example of manufacture employs the dual roll method, it is possible to use single roll method instead.

Figure 4:
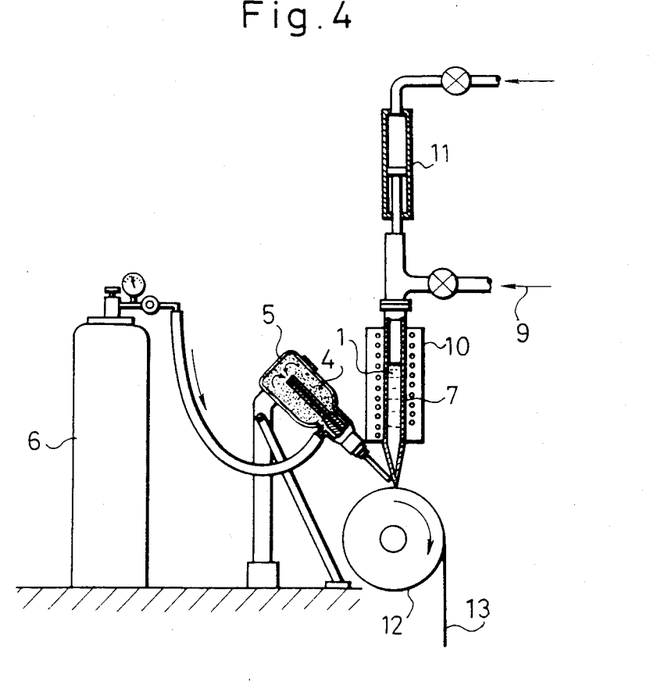
FIG. 4 is a view showing the principle of another method of producing a core material according to the invention.

The principle of a second example of manufacture on which a core material is produced is now described by referring to FIG. 4. An ingot of the matrix 1 of an alloy which is made by rapid quenching is put into a heat-resisting tube 7, which is made from quartz glass and has a nozzle at its lower end. Then, the occluded gas in the tube 7 is sufficiently replaced by inert gas 9 such as argon gas. The ingot of the matrix 1 is heated in such an extent that it is molten but second phase particles (described later) does not melt by a high-frequency melting furnace 10 installed on the outer periphery of the tube 7. Thereafter, a piston 11 is operated so that it may come closest to the upper surface of a roller 12 which is rotating the front end of the nozzle of the tube 7. Thus, the pressure of the inert gas within the tube 7 is abruptly increased, causing the molten matrix 1 to be supplied as a uniform continuous stream to the periphery of the roller 12 from the nozzle. The second phase particles 4 are sprayed against and added to the stream of the matrix 1 coming out of the tube 7, together with a spray medium such as argon gas by a plasma spray gun 5. The molten matrix 1 to which the second phase particles 4 are added is rapidly solidified while stretched on the roll 12 to obtain a continuous ribbonlike core material 13. Similarly to the core material 13 shown in FIG. 3, the core material 13 obtained in this way has the microscopic second phase particles 4 dispersed in the matrix 14 of the alloy uniformly in a three-dimensional way.

According to the single roll method described in connection with FIG. 4, a relatively broad and thin material like film can be readily produced. Although this example of manufacture employs the single roll method, dual roll method can be used instead.

Figure 5:
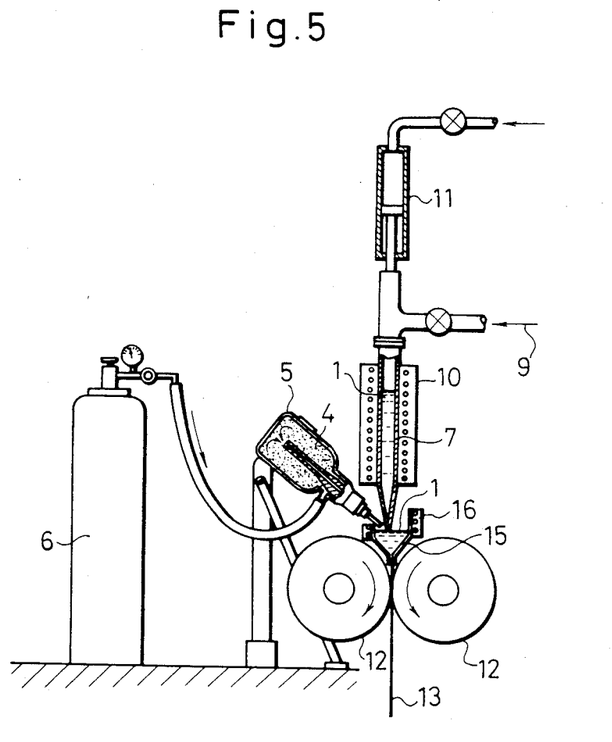
FIG. 5 is a view showing the principle of a further method of producing a core material according to the invention.

The principle of a third example of manufacture on which a core material is produced according to the invention is now described by referring to FIG. 5. An ingot of the matrix of an alloy 1 which is made by rapid quenching is put into a heat-resisting tube 7, which is made from quartz glass and has a nozzle at its lower end. Then, the occluded gas in the tube is sufficiently replaced by inert gas 9 such as argon gas. The ingot of the matrix 1 is then heated by a high-frequency melting furnace 10 mounted on the outer periphery of the tube 7 to such an extent that the ingot is molten but second phase particles 4 (described later) are not molten. Thereafter, a piston 11 is actuated to abruptly increase the pressure of the inert gas in the tube 7 for pouring the molten matrix 1 into a melt reservoir 15 which is disposed below the tube. While the matrix 1 is being pushed out of the tube 7, the second phase particles 4 are sprayed against this stream of the matrix by a plasma spray gun 5 to add the particles to the matrix. A second high-frequency melting furnace 16 is mounted on the outer periphery of the revervoir 15 to keep the matrix in molten condition.

In this way, the matrix 1 of the alloy containing the second phase particles 4 is supplied as a uniform continuous thin stream from the nozzle below the reservoir 15 to the junction of rolls 12 by an inert gas (argon gas) pressurizing device (not shown). As a result, the matrix is quite rapidly cooled, and a ribbonlike core material 13 is obtained in the same manner as the foregoing examples of manufacture. The microscopic second phase particles 4 are dispersed in the matrix 14 of the alloy of the core material 13 uniformly in a three-dimensional manner in the same fashion as the core material shown in FIG. 13. Although this example of manufacture makes use of the dual roll method, single roll method can be used instead.

When the ingot of the matrix of the rapidly quenched alloy is produced or the ingot is refused for subsequent rapid quenching, the second phase particles may be dispersed in the matrix in a three-dimensional way without using the aforementioned spray dispersion. Specifically, the second phase particles are simply added to the molten matrix, and then stirring it by high-frequency waves. Subsequently, the matrix is rapidly cooled to disperse the particles.

This alternative method, however, limits the kind of usable second phase particles and the quantity of dispersion. Especially, when the second phase particles are made from a metal oxide such as $Cr_2O_3$ or $CeO_2$, they do not readily wet a molten metal such as iron, cobalt, or nickel and so only a quite small amount of the particles is dispersed. Further, the particles tend to aggregate in the surface layer of the matrix of the alloy.

The surface phenomenon that takes place when the second phase particles are added to and dispersed in the molten matrix can be considered as comprising the following two stages. In the first stage, the second phase particles come into contact with the molten matrix. At this time, there exist three phases, namely, liquid phase of the molten matrix, solid phase of the second phase particles, and liquid phase containing argon gas (inert gas). In the second stage, the second particles are suspended in the molten matrix. At this time, there exist two phases, namely, liquid phase of the molten matrix and solid phase of the second phase particles.

Further, the aforementioned surface phenomenon involving the three phases can be classified into three major wettings: adhesive wetting, spreading wetting, and immersion wetting. The work Wa done to cause adhesive wetting, the work Ws done to cause spreading wetting, and the work Wi done to cause immersion wetting are defined as follows:

$$Wa = \gamma_{SV} - \gamma_{SL} + \gamma_{LV} \quad (1)$$

$$Ws = \gamma_{SV} - \gamma_{SL} - \gamma_{LV} \quad (2)$$

$$Wi = \gamma_{SV} - \gamma_{SL} \quad (3)$$

where $\gamma_{SL}$ is the surface tension acting on the interface between the solid phase and the liquid phase, $\gamma_{SV}$ is the surface tension of the solid phase, and $\gamma_{LV}$ is the surface tension of the liquid phase.

The surface of the solid phase at the interface between the gas phase and the solid phase and at the interface between the liquid phase and the solid phase is considered to be hardly deformed. Thus, the relation holds:

$$\gamma_{SV} - \gamma_{SL} = \gamma_{LV} \cos\theta \quad (4)$$

where $\theta$ is the contact angle with the liquid phase. By substituting this formula into the formulae (1), (2), and (3) above, the following formulae are obtained:

$$Wa = \gamma_L(\cos\theta + 1) \quad (5)$$

$$Ws = \gamma_L(\cos\theta - 1) \quad (6)$$

$$Wi = \gamma_{LV} \cos\theta \quad (7)$$

Each of these three formulae means that if W assumes a positive value, wetting property appears. As can be seen from the formulae (5)–(7) above, in the first stage where the second phase particles make contact with the molten matrix of the alloy, the contact angle $\theta$ of the second phase particles to the matrix contributes greatly to the capability to wet. In general, metal oxides have large contact angles $\theta$ to molten metals such as iron, cobalt, and nickel, and therefore the metal oxides have small wettability with respect to the molten metals.

For this reason, if the second phase particles are simply added to the molten matrix and stirred by application of high-frequency waves, the second phase particles will not acquire familiarity with the matrix. As a result, the particles tend to collect on the surface layer side of the matrix. Accordingly, if a metal oxide is used for the second phase particles, the largest quantity of the particles that can be dispersed in the matrix is only of the order of 0.1% by volume. Since the quantity of dispersion is quite small in this way, the addition of the second phase particles does not produce a marked effect.

In contrast with this, by adding the second phase particles to the molten matrix of the alloy by spray dispersion when an ingot of the matrix is produced or the ingot is fused for subsequent rapid quenching as mentioned above, the particles are mechanically forced into the matrix by strong spray energy. This forces the second phase particles which do not readily wet the matrix to be uniformly dispersed throughout the matrix. Consequently, the number of kinds of the usable second phase particles and the maximum quantity of dispersion possible can be increased, thereby greatly contributing to improvements in the characteristics and functions of the core material.

One example of contact angle of a solid phase to a molten metal is given by Table 1 below.

TABLE 1

| solid phase | molten metal | temper. (°C.) | atmosphere | contact angle ($\theta$) |
|---|---|---|---|---|
| $Al_2O_3$ | Fe | 1580 | inactive | $\simeq 90$ |
| $Al_2O_3$ | Co | 1550 | inactive | $>90$ |
| $Cr_2O_3$ | Fe | 1550 | argon | 88 |
| $ZrO_2$ | Ni | 1500 | vacuum | 118 |
| $ZrO_2$ | Fe | 1550 | vacuum | 92 |
| TiC | Co | 1450 | argon | 16 |
| NbC | Co | 1500 | argon | 0 |
| WC | Co | 1500 | argon | 0 |
| $NbB_2$ | Co | 1500 | argon | 22–46 |

As can be seen from the table above, metal oxides generally have larger contact angles than other solid phases, and are not easily wetted by molten metals.

EXAMPLE 1

$(Co_{70.5}Fe_{4.5}Si_{15}B_{10})_{99.5}(WC)_{0.5}$ $(Co_{70.5}Fe_{4.5}Si_{15}B_{10})_{99}(WC)_{1}$ $(Co_{70.5}Fe_{4.5}Si_{15}B_{10})_{98}(WC)_{2}$ $(Co_{70.5}Fe_{4.5}Si_{15}B_{10})_{95}(WC)_{5}$ $(Co_{70.5}Fe_{4.5}Si_{15}B_{10})_{90}(WC)_{10}$

Core materials consisting of the alloys of the second phase particle dispersive type having the above compositions were produced, the alloys being made by rapid quenching. In the composition formulae above, the left parentheses indicate the compositions of the alloys. The subscripts to the right of each element indicate atomic percentage of each element. The second phase particles are shown in the right parentheses of the composition formulae. The subscripts written to the right of the right and left parentheses indicate the percentages by volume of the alloys and of the particles. The same notation is used in other examples.

The core materials were prepared in the following manner. First, 420.9 g of Co, 22.5 g of Fe, 42.7 g of Si, and 110 g of B were measured to obtain the desired composition of an alloy produced by rapid quenching. These constituent metals were fused together by the vacuum high-frequency melting furnace 2 shown in FIG. 2 to produce the molten matrix 1, which was then poured into the mold 3 without undergoing other operations.

Fine powder of WC, or the second phase particles 4, had been previously put in the plasma spray gun 5. The pressurized argon gas in the bomb 6 caused the powder to be sprayed against the matrix 1 which was being poured into the mold. The quantity of spray of the fine powder of WC was controlled to the percentage by volume with respect to the matrix 1 as indicated by the above-described composition formula by the gun 5. The temperature of the matrix 1 when it was poured into the mold 3 was controlled approximately to 1200° C. that was sufficiently high to maintain the molten state but not so high as to melt the powder of WC.

The fine powder of WC sprayed against the stream of the molten matrix 1 which was directed toward the mold was not collect together in the matrix 1, but rather it was dispersed throughout the matrix while held in particulate state. Further, the gaps among the particles were short. The dispersed fine powder which were kept in particulate condition were slow in floating in the matrix 1. Therefore, when the matrix 1 solidified in the mold 3, the powder did not segregate. Thus, the dispersion state was stable. In this way, ingot 8 consisting of a Co Fe-Si-B alloy in which the fine powder of WC was uniformly dispersed was obtained.

Then, ingot 8 was put into the heat-resisting tube 7 made from quartz glass, as shown in FIG. 2. Subsequently, the occluded gas in the tube was sufficiently replaced by argon gas 9, and the ingot 8 was heated by the high frequency melting furnace 10 at a temperature of about 1200° C. such that the ingot was molten but the fine powder of WC did not melt. Then, the piston 11 was so operated as to come closest to the junction of the two rolls 12 which were rotating the nozzle at the end of the tube at a high velocity, in order to abruptly elevate the pressure of the argon gas within the tube 7. Then, the ingot 8 was delivered from the nozzle as a uniform continuous stream to the junction of the rolls 12. Since the rolls 12 were cooled and rapidly turned while pressed against each other always, the matrix pushed out was immediately cooled and solidified, producing a ribbonlike core material 13 having a width of 40 mm, a thickness of 30 μm, and a length of 5 m.

Observation of the surface of the core material 13 and of the cut surface along the thickness by means of a scanning electron microscope has shown that the fine powder of WC is uniformly dispersed in the matrix in the form of separate fine powder without collecting together and that no pits are produced. This means that the fine powder of WC is dispersed throughout the matrix uniformly in three-dimensional way. Further, X-ray diffraction analysis has revealed that the alloy formed by the rapid quenching is amorphous.

Figure 6:
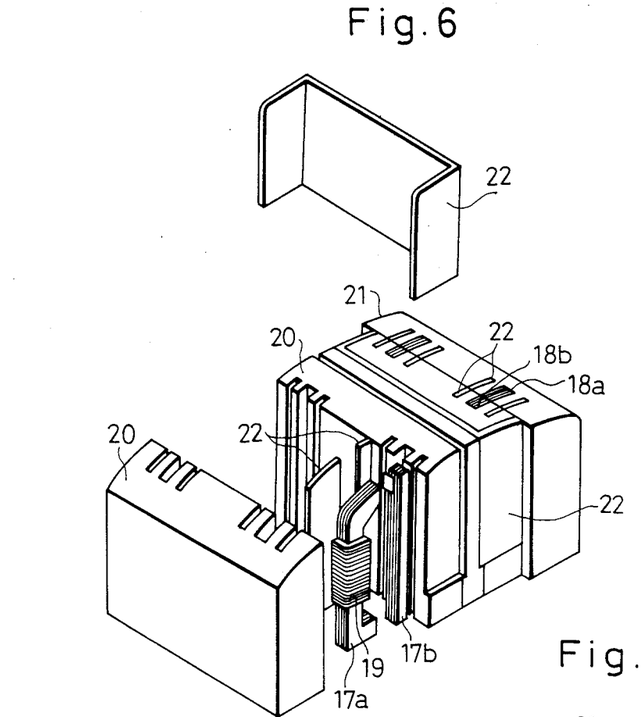
FIG. 6 is a partially exploded perspective view of a magnetic head which is used for digital signals and produced according to Example 1 of the invention.
Figure 7:
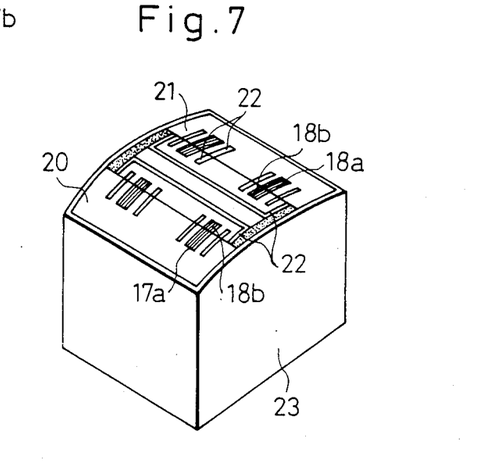
FIG. 7 is a perspective view of the magnetic head shown in FIG. 6 after the head has been assembled.

Then, sheets of a given shape were continuously blanked out of the core material 13. As shown in FIGS. 6 and 7, a certain number of the sheets were stacked and bonded together with a molded epoxy resin to fabricate split cores 17a, 17b and 18a, 18b. The cores 17a and 17b are used for reading purposes, while the cores 18a and 18b are used for writing purposes. Coils 19 were wound on the cores 17a and 18a as shown in FIG. 6. These cores 17a and 18a were fitted in grooves formed in the body of a reading head 20 and in the body of a writing head 21. Several cross field shield plates 22 were disposed in position, and these components were assembled and housed in a shield case 23 as shown in FIG. 7, thus completing the assembly of a magnetic head for digital signals.

EXAMPLE 2

(Ni$_{78}$Si$_{10}$B$_{12}$)$_{97}$(WC)$_3$ (Ni$_{78}$Si$_{10}$B$_{12}$)$_{92}$(WC)$_8$ (Ni$_{78}$Si$_{10}$B$_{12}$)$_{82}$(WC)$_{18}$

Core materials consisting of the rapidly quenched alloys of the second phase particle dispersive type having the compositions as expressed by the formulae above were produced in the manner described below. First, 459 g of Ni, 28 g of Si, and 13 g of B were measured, and then they were fused together by the vacuum high-frequency melting furnace to produce the matrix of an alloy, which was then poured into the mold. Fine powder of WC, or the second phase particles, were sprayed against the stream of the matrix 1 that was being poured, together with pressurized argon gas by the plasma spray gun. Then, the matrix was cooled to form an ingot consisting of an Ni-Si-B alloy in which fine powder of WC was uniformly dispersed. By controlling the temperature approximately to 1200° C. when the fine powder of WC was sprayed and dispersed, the added fine powder of WC was not dissolved in the matrix, but rather it was uniformly dispersed while kept in particulate condition.

Then, the ingot was put into a heat-resisting tube disposed just above one roll, and the gas in the tube was sufficiently replaced by argon gas. Subsequently, the inside of the tube is heated to a temperature of about 1200° C. and kept at that temperature by the high-frequency melting furnace mounted on the outer periphery of the tube to refuse only the matrix. Thereafter, the pressure in the argon gas in the tube was abruptly increased to push the molten matrix containing the fine powder of WC out of the lower nozzle of the tube onto the roll rotating at 2000 r.p.m. Immediately thereafter, the matrix was cooled and solidified thus to form a ribbonlike core material having a width of 40 mm, a thickness of 30 μm, and a length of 5 m.

Observation of the surface of this core material and of the cut surface in the direction of the thickness by means of a scanning electron microscope has shown that the fine powder of WC is uniformly dispersed in the form of fine particles throughout the matrix of the alloy in the same manner as the foregoing example. Further, X-ray diffraction analysis has shown that the matrix is amorphous.

The manner in which a magnetic head as shown in FIG. 7 is produced using this core material is identical to the aforementioned example and hence it will not be described below.

EXAMPLE 3

(Co$_{70.5}$Fe$_{4.5}$Si$_{15}$B$_{10}$)$_{99.9}$(Cr$_2$O$_3$)$_{0.1}$ (Co$_{70.5}$Fe$_{4.5}$Si$_{15}$B$_{10}$)$_{99.7}$(Cr$_2$O$_3$)$_{0.3}$ (Co$_{70.5}$Fe$_{4.5}$Si$_{15}$B$_{10}$)$_{99.5}$(Cr$_2$O$_3$)$_{0.5}$ (Co$_{70.5}$Fe$_{4.5}$Si$_{15}$B$_{10}$)$_{99}$(Cr$_2$O$_3$)$_1$ (Co$_{70.5}$Fe$_{4.5}$Si$_{15}$B$_{10}$)$_{97}$(Cr$_2$O$_3$)$_3$

Magnetic head were fabricated using the core materials consisting of rapidly quenched alloys of the second phase particles dispersive type having the compositions given by the formulae above in the same manner as the foregoing examples.

EXAMPLE 4

(Co$_{70.5}$Fe$_{4.5}$Si$_{15}$B$_{10}$)$_{99.9}$(CeO$_2$)$_{0.1}$ (Co$_{70.5}$Fe$_{4.5}$Si$_{15}$B$_{10}$)$_{99.7}$(CeO$_2$)$_{0.3}$ (Co$_{70.5}$Fe$_{4.5}$Si$_{15}$B$_{10}$)$_{99.5}$(CeO$_2$)$_{0.5}$ $(Co_{70.5}Fe_{4.5}Si_{15}B_{10})_{99}(CeO_2)_1$ $(Co_{70.5}Fe_{4.5}Si_{15}B_{10})_{97}(CeO_2)_3$

Magnetic heads were fabricated using the rapidly quenched alloys of the second phase particle dispersive type having the compositions expressed by the formulae above in the same manner as the foregoing examples.

EXAMPLE 5

$(Co_{70.5}Fe_{4.5}Si_{15}B_{10})_{99.9}(WO_3)_{0.1}$ $(Co_{70.5}Fe_{4.5}Si_{15}B_{10})_{99.7}(WO_3)_{0.3}$ $(Co_{70.5}Fe_{4.5}Si_{15}B_{10})_{99.5}(WO_3)_{0.5}$ $(Co_{70.5}Fe_{4.5}Si_{15}B_{10})_{99}(WO_3)_1$ $(Co_{70.5}Fe_{4.5}Si_{15}B_{10})_{97}(WO_3)_3$

Magnetic heads were fabricated using the rapidly quenched alloys of the second phase particle disperstive type having the compositions expressed by the formulae above in the same manner as the foregoing examples.

EXAMPLE 6

$(Co_{70.5}Fe_{4.5}Si_{15}B_{10})_{99.9}(ZrO_2)_{0.1}$ $(Co_{70.5}Fe_{4.5}Si_{15}B_{10})_{99.7}(ZrO_2)_{0.3}$ $(Co_{70.5}Fe_{4.5}Si_{15}B_{10})_{99.5}(ZrO_2)_{0.5}$ $(Co_{70.5}Fe_{4.5}Si_{15}B_{10})_{99}(ZrO_2)_1$ $(Co_{70.5}Fe_{4.5}Si_{15}B_{10})_{97}(ZrO_2)_3$

Magnetic heads were fabricated using the rapidly quenched alloys of the second phase particle dispersive type having the compositions expressed by the formulae above in the same manner as the foregoing examples.

EXAMPLE 7

$(Co_{70.5}Fe_{4.5}Si_{15}B_{10})_{99.9}(Y_2O_3)_{0.1}$ $(Co_{70.5}Fe_{4.5}Si_{15}B_{10})_{99.7}(Y_2O_3)_{0.3}$ $(Co_{70.5}Fe_{4.5}Si_{15}B_{10})_{99.5}(Y_2O_3)_{0.5}$ $(Co_{70.5}Fe_{4.5}Si_{15}B_{10})_{99}(Y_2O_3)_1$ $(Co_{70.5}Fe_{4.5}Si_{15}B_{10})_{97}(Y_2O_3)_3$

Magnetic heads were fabricated using the rapidly quenched alloys of the second phase particle dispersive type having the compositions expressed by the formulae above in the same manner as the foregoing examples.

EXAMPLE 8

$(Ni_{78}Si_{10}B_{12})_{90}(ThO_2)_{10}$ $(Ni_{78}Si_{10}B_{12})_{80}(ThO_2)_{20}$

Magnetic heads were fabricated using the rapidly quenched alloys of the second phase particle dispersive type having the compositions expressed by the formulae above in the same manner as the foregoing examples.

EXAMPLE 9

$(Ni_{75}Si_{10}B_{15})_{95}(TiC)_5$ $(Ni_{75}Si_{10}B_{15})_{90}(TiC)_{10}$

Magnetic heads were fabricated using the rapidly quenched alloys of the second phase particle dispersive type having the compositions expressed by the formulae above in the same manner as the foregoing examples. Observation by means of a scanning electron microscope has shown that TiC is dispersed in the matrices of the rapidly quenched Ni-Si-B alloys uniformly in a three-dimensional way and that no pits are formed. Further, X-ray diffraction analysis has revealed that the matrices of the alloys are amorphous.

EXAMPLE 10

$(Fe_{89.4}Mo_9C_{1.6})_{98}(NbC)_2$ $(Fe_{89.4}Mo_9C_{1.6})_{95}(NbC)_5$ $(Fe_{89.4}Mo_9C_{1.6})_{90}(NbC)_{10}$

Magnetic heads were fabricated using the rapidly quenched alloys of the second phase particle dispersive type having the compositions expressed by the formulae above in the same manner as the foregoing examples. Observation using a scanning electron microscope has shown that NbC is dispersed in the matrices of the rapidly quenched Fe-Mo-C alloys uniformly in a three-dimensional way and that no pits are formed. X-ray diffraction analysis has revealed that the matrices of the alloys are a single-phase nonequilibrium γ-austenite consisting of hyperfine crystalline grains. This single phase of the austenite is a crystalline alloy, and therefore it is thermally stabler than amorphous alloys.

EXAMPLE 11

$(Cu_{60}Zr_{40})_{90}(SiC)_{10}$ $(Cu_{60}Zr_{40})_{70}(SiC)_{30}$

Magnetic heads were fabricated using the rapidly quenched alloys of the second phase particle dispersive type having the compositions expressed by the formulae above in the same manner as the foregoing examples. Observation using a scanning electron microscope has shown that SiC is dispersed in the matrices of the rapidly quenched Cu-Zr alloys uniformly in a three-dimensional way and that no pits are formed. X-ray diffraction analysis has revealed that the matrices of the alloys are amorphous.

EXAMPLE 12

$(Ni_{78}Si_{10}B_{12})_{90}(BN)_{10}$ $(Ni_{78}Si_{10}B_{12})_{80}(BN)_{20}$

Magnetic heads were fabricated using the rapidly quenched alloys of the second phase particle dispersive type having the compositions expressed by the formulae above in the same manner as the foregoing examples. Observation using a scanning electron microscope has shown that BN is dispersed in the matrices of the rapidly quenched Ni-Si-B alloys uniformly in a three-dimensional way and that no pits are formed. X-ray diffraction analysis has revealed that the matrices of the alloys are amorphous.

EXAMPLE 13

$(Zr_{45}Nb_{40}Si_{15})_{80}(NbN)_{20}$

A magnetic head was fabricated using the rapidly quenched alloy of the second phase particle dispersive type having the composition expressed by the formula above in the same manner as the foregoing examples. Observation using a scanning electron microscope has shown that NbN is dispersed in the matrix of the rapidly quenched Zr-Nb-Si alloy uniformly in a three-dimensional was and that no pits are formed. X-ray diffraction analysis has revealed that the matrix of the alloy is amorphous.

EXAMPLE 14

$(Co_{70.5}Fe_{4.5}Si_{15}B_{10})_{99}(C)_1$ $(Co_{70.5}Fe_{4.5}Si_{15}B_{10})_{95}(C)_5$ $(Co_{70.5}Fe_{4.5}Si_{15}B_{10})_{90}(C)_{10}$

Magnetic heads were fabricated using the rapidly quenched alloys of the second phase particle dispersive type having the compositions expressed by the formulae above in the same manner as the foregoing examples. Observation using a scanning electron microscope has shown that C is dispersed in the matrices of the rapidly quenched Co-Fe-Si-B alloys uniformly in a three-dimensional way and that no pits are formed. X-ray diffraction analysis has revealed that the matrices of the alloys are amorphous.

EXAMPLE 15

$(Fe_{82}B_{18})_{99}(Fe)_1$ $(Fe_{82}B_{18})_{98}(Fe)_2$

Magnetic heads were fabricated using the rapidly quenched alloys of the second phase particle dispersive type having the compositions expressed by the formulae above in the same manner as the foregoing examples. Observation using a scanning electron microscope has shown that Fe is dispersed in the matrices of the rapidly quenched Fe-B alloys uniformly in a three-dimensional way. Further, X-ray diffraction analysis has revealed that the matrices are amorphous invar.

Figure 8:
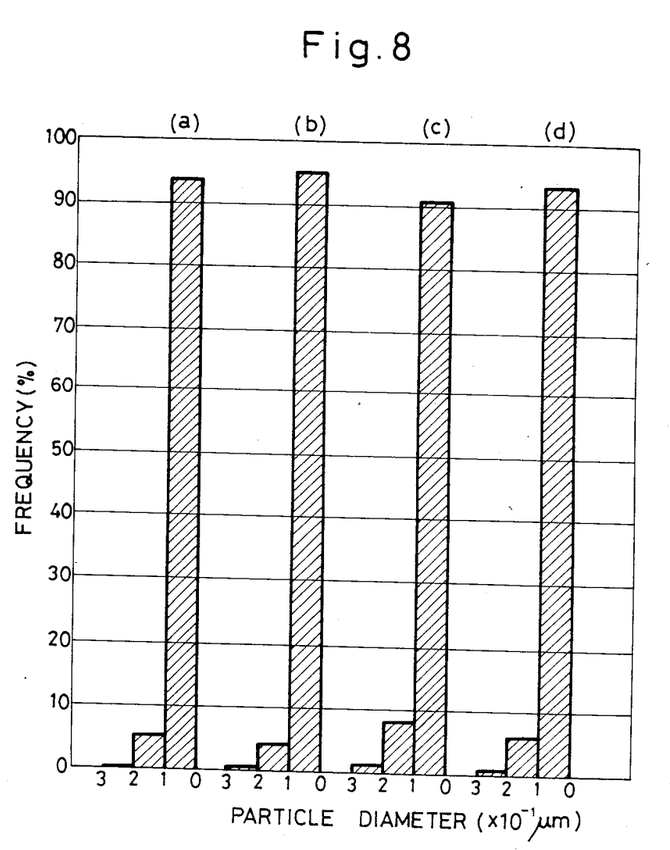
FIG. 8 is a graph showing the size distributions of second phase particles in matrices of alloys.

FIG. 8 is a graph showing the size distribution of the second phase particles in the matrices of alloys formed by rapid quenching. The alloys which are indicated by FIGS. 8 (a), (b), (c), and (d) were produced by using TiC, WC, $Cr_2O_3$, and $ZrO_2$, respectively, as second phase particles, which were sprayed against the matrix of a $Co_{70.5}Fe_{4.5}Si_{15}B_{10}$ alloy that was made by rapid quenching, so that the particles were dispersed in the matrix. The diameters of the particles were measured with an electron microscope. It has been found that all of the average particle diameters of these second phase particles was approximately 0.06 μm. As may be seen from the graph, about 70% or more of the dispersed second phase particles is less than about 0.1 μm. Hence, it is necessary to appropriately control the diameters of the second phase particles yet to be added or adjust the conditions under which they are sprayed, to disperse the second phase particles while keeping them in particulate condition.

Table 2 below shows the average particle diameters of other kinds of second phase particles in the matrix of a $Co_{70.5}Fe_{4.5}Si_{15}B_{10}$ alloy which was made by rapid quenching.

TABLE 2

| second phase particles | average particle diameter (μm) | second phase particles | average particle diameter (μm) |
|---|---|---|---|
| $CeO_2$ | 0.05 | $WO_3$ | 0.05 |
| $Y_2O_3$ | 0.08 | $ThO_2$ | 0.07 |
| BN | 0.06 | SiC | 0.05 |
| NbN | 0.08 | C | 0.08 |
| NbC | 0.08 | | |

As most of the second phase particles are maintained in particulate state in this way, the dispersion of the particles in a molten matrix is stable. Specifically, in the stage where the second phase particles are suspended in a molten matrix, there exists a disperse system in which the matrix is the dispersion medium and the second phase particles are the disperse phase. This disperse system is thermodynamically unstable and so dispersion or aggregation of second phase particles is strongly affected by a change ΔF in free energy. In general, a change ΔF in free energy includes a change in interfacial energy and a change caused by chemical reaction. When a molten matrix of an alloy and second phase particles are in equilibrium state, change in the free energy caused by chemical reaction is considered to be null. Hence, it follows that the dispersive state of second phase particles is controlled by changes in interfacial energy.

Dispersion of second phase particles in the molten matrix of an alloy removes the interface between solid phase (second phase particles) and solid phase (second phase particles), and it produces an interface between solid phase (second phase particles) and liquid phase (molten matrix). Thus, the change $\Delta F_s$ in the interfacial energy caused at this time is defined as follows:

$$\Delta F_s = 2\gamma_{SL} - \gamma_{SS} \qquad (8)$$

where $\gamma_{ss}$ is the interfacial tension occurring at the interface between solid phases.

It can be understood from this formula that if $\Delta F_s$ assumes a negative value, the second phase particles are dispersed or suspend themselves, and that if it assumes a positive value, they aggregate. In order to make the change $\Delta F_s$ in the interfacial energy which is caused when the interface between solid phases changes to the interface between solid phase and liquid phase, it is required that sizes of the second phase particles be made as small as possible. If about more than 70%, preferably more than 90%, of the second phase particles dispersed in the manner described above have diameters less than approximately 0.1 μm, then the particles will not aggregate, whereby the dispersion is maintained stable and homogeneous.

A magnetic head, which is made from a core material consisting of $(Co_{70.5}Fe_{4.5}Si_{15}B_{10})_{99}(WC)_2$ obtained in Example 1 above and is encased by a molded epoxy resin, exhibits a permeability of 4000 at 1 MHz. On the other hand, a magnetic head, which is made from the core material consisting of permalloy (20% Fe; 80% Ni) and is encased by a molded epoxy resin, exhibits a permeability of about 800 at best at 1 MHz. For the magnetic head according to the present invention, the encasement by the resin caused almost no decrease in the permeability, and the high permeability has been maintained after the encasement.

Further, peak shift that indicates phase shift of a signal waveform at high frequencies was measured for both magnetic heads. The conventional head made from permalloy showed a peak shift of 150 to 260 ns, while the novel head showed a smaller peak shift of 100 to 150 ns. Thus, the novel head is improved in the symmetry of signal waveforms at high frequencies as compared with the conventional head. The measurements of the peak shift were made under the conditions of tape traveling velocity of 125 ips, line density of 9042 Fci, pattern of NRZI 11, 100 (peak shift between 0 and 1), and writing current of ISATX 1.8.

Since the novel magnetic head is constructed as thus far described, permeability at high frequencies is high, and the symmetry of peak shift is excellent. Consequently, margin of error of peripheral equipments utilizing the novel magnetic heads can be reduced to enhance the reliability.

As many apparently widely different embodiments of this invention may be made without departing from the spirit and scope thereof, it is to be understood that the invention is not limited to the specific embodiments thereof except as defined in the appended claims.

What is claimed is:

1. A magnetic head for digital signals, the head constituting at least a part of a magnetic circuit and made from a plurality of sheets adhered and bonded together with a molded resin, said sheets comprising a composite material made of a matrix of a rapidly quenched alloy in the form of an amorphous phase and at least one kind of second phase particles dispersed in the matrix uniformly in a three-dimensional manner, wherein approximately 70% or more of said second phase particles have diameters less than approximately 0.1 micron.

2. A magnetic head as set forth in claim 1, wherein the matrix of the alloy contains cobalt as its main constituent, and wherein the alloy is amorphous.

3. A magnetic head as set forth in claim 1, wherein the matrix of the alloy contains nickel as its main constituent, and wherein the alloy is amorphous.

4. A magnetic head as set forth in claim 1, wherein the matrix of the alloy contains iron as its main constituent, and wherein the alloy is amorphous.

5. A magnetic head as set forth in claim 1, wherein the second phase particles are a carbide.

6. A magnetic head as set forth in claim 5, wherein the second phase particles are tungsten carbide.

7. A magnetic head as set forth in claim 1, wherein the second phase particles are carbon.

8. A magnetic head as set forth in claim 1, wherein the second phase particles are an oxide.

9. A magnetic head as set forth in claim 8, wherein the second phase particles are chromium oxide.

10. A magnetic head as set forth in claim 1, wherein the second phase particles are a nitride.

11. A magnetic head as set forth in claim 1, wherein the second phase particles are a silicate.

12. A magnetic head as set forth in claim 1, wherein the second phase particles are a metal.

13. A magnetic head as set forth in claim 1, wherein approximately more than 70% of the second phase particles uniformly dispersed in the matrix of the alloy have diameters less than approximately 0.1 $\mu$m.

14. A magnetic head as set forth in claim 1, wherein the composite material is shaped into sheet members, and wherein each core of the head is composed of a certain number of the sheet members stacked on top of one another.

15. A magnetic head as set forth in claim 1, wherein the composite material is formed by heating and melting the matrix of the alloy, then spraying the second phase particles against the matrix together with a spray medium consisting of an inert gas to disperse the particles in the matrix before the matrix solidifies, subsequently cooling the matrix to form an ingot in which the second phase particles are uniformly dispersed, refusing the ingot such that the second phase particles do not melt, and solidifying the ingot by rapid quenching.

16. A magnetic head as set forth in claim 1, wherein the composite material is formed by heating the matrix of the alloy in such an extent that the matrix melts but the second phase particles do not, spraying the second phase particles against the molten matrix together with a spray medium consisting of an inert gas to disperse the particles before the matrix solidifies, and then solidifying the matrix by rapid quenching.

17. A magnetic hed as set forth in claim 15 or 16, wherein the second phase particles are a metal that is not readily wetted by the matrix of the alloy.

18. A magnetic head as set forth in claim 17, wherein the second phase particles are chromium oxide.

19. A magnetic hed as set forth in claim 15 or 16, wherein approximately more than 70% of the second phase particles uniformly dispersed in the matrix of the alloy have diameters less than approximately 0.1 $\mu$m.

* * * * *